United States Patent [19]

Park

[11] Patent Number: 5,579,069
[45] Date of Patent: Nov. 26, 1996

[54] CAMERA WITH SPECIAL SWITCH ASSEMBLY

[75] Inventor: Myeong-je Park, Changwon-si, Rep. of Korea

[73] Assignee: Samsung Aerospace Industries, Ltd., Kyeongsangnam-do, Rep. of Korea

[21] Appl. No.: 253,495

[22] Filed: Jun. 3, 1994

[30] Foreign Application Priority Data

Dec. 22, 1993 [KR] Rep. of Korea ................ 93-29018

[51] Int. Cl.$^6$ ................ G03B 1/18; G03B 7/00
[52] U.S. Cl. ................ 396/72; 396/297; 396/543
[58] Field of Search ................ 354/486, 195.12, 354/195.1, 266

[56] References Cited

U.S. PATENT DOCUMENTS 4,763,156  8/1988  Ishikawa et al. .................. 354/442
5,148,201  9/1992  Umetsu et al. .................. 354/195.1
5,257,053  10/1993  Kobayashi et al. .............. 354/195.1
5,428,418  6/1995  Inaba ................................ 354/195.12

FOREIGN PATENT DOCUMENTS 58-9127  1/1983  Japan .................. 354/195.1
167334  7/1988  Japan .................. 354/195.1
1254937  10/1989  Japan .................. 354/266

Primary Examiner—Howard B. Blankenship
Assistant Examiner—Christopher E. Mahoney
Attorney, Agent, or Firm—Finnegan, Henderson, Farabow, Garrett & Dunner, L.L.P.

[57] ABSTRACT

A switch assembly for a camera with a zoom lens including a shutter release switch for effectuating a photographic operation of the camera, a telephoto switch for effectuating the movement of the zoom lens to a telephoto position, and a wide-angle switch for effectuating the movement of the zoom lens to a wide-angle position in which the telephoto and wide-angle switches are adjacent and surround the shutter release switch.

2 Claims, 5 Drawing Sheets

CAMERA WITH SPECIAL SWITCH ASSEMBLY

BACKGROUND OF THE INVENTION

1. Field of the Invention

The present invention relates generally to a camera having a special switch assembly and more particularly to a camera with a switch assembly for operating a motor-driven zoom lens between a telephoto position and a wide-angle position and for releasing the shutter.

2. Description of the Related Art

A popular type of camera has a motor-driven zoom lens for obtaining a variable focal length and hence a range of magnification between a telephoto magnification and a wide-angle magnification. Switches for operating the zoom lens include a power switch for driving the zoom lens into a stand-by state, a telephoto switch and a wide-angle switch for driving the zoom lens between a telephoto position and a wide-angle position. The typical camera also includes a shutter release switch, a "through-the-window" switch for photographing outside through a window, a strobe mode switch, etc.

FIG. 7 shows a camera including a power button 104, a telephoto button 106, a wide-angle button 108 and, a release button 110 on top of the main body 102. The telephoto button 106, the wide-angle button 108, and the shutter release button 110 are frequently used. Because the telephoto button 106, the wide-angle button 108 and the shutter release button 110 are arranged apart from each other, it may take excessive time for the user to find and push the shutter release button 110 after pushing the telephoto button 106 and/or the wide-angle button 108. This excessive time can be a burden if one is attempting to take a picture of a transient image.

SUMMARY OF THE INVENTION

It is an object of the present invention to provide an improved arrangement of switches for operating a camera zoom lens and shutter.

To achieve this and other objects of the invention, a switch assembly for a camera with a zoom lens of the present invention, as embodied and broadly defined herein, includes a shutter release switch for effectuating a photographic operation of the camera. The switch assembly includes a telephoto switch for effectuating the movement of the zoom lens to a telephoto position and a wide-angle switch for effectuating the movement of the zoom lens to a wide-angle position. The telephoto and wide-angle switches are adjacent and surround the shutter release switch.

The accompanying drawings, which are incorporated in and which constitute a part of this specification, illustrate one embodiment of the invention and, together with the description, explain the principles of the invention.

DETAILED DESCRIPTION OF THE PREFERRED EMBODIMENTS

Figure 1:
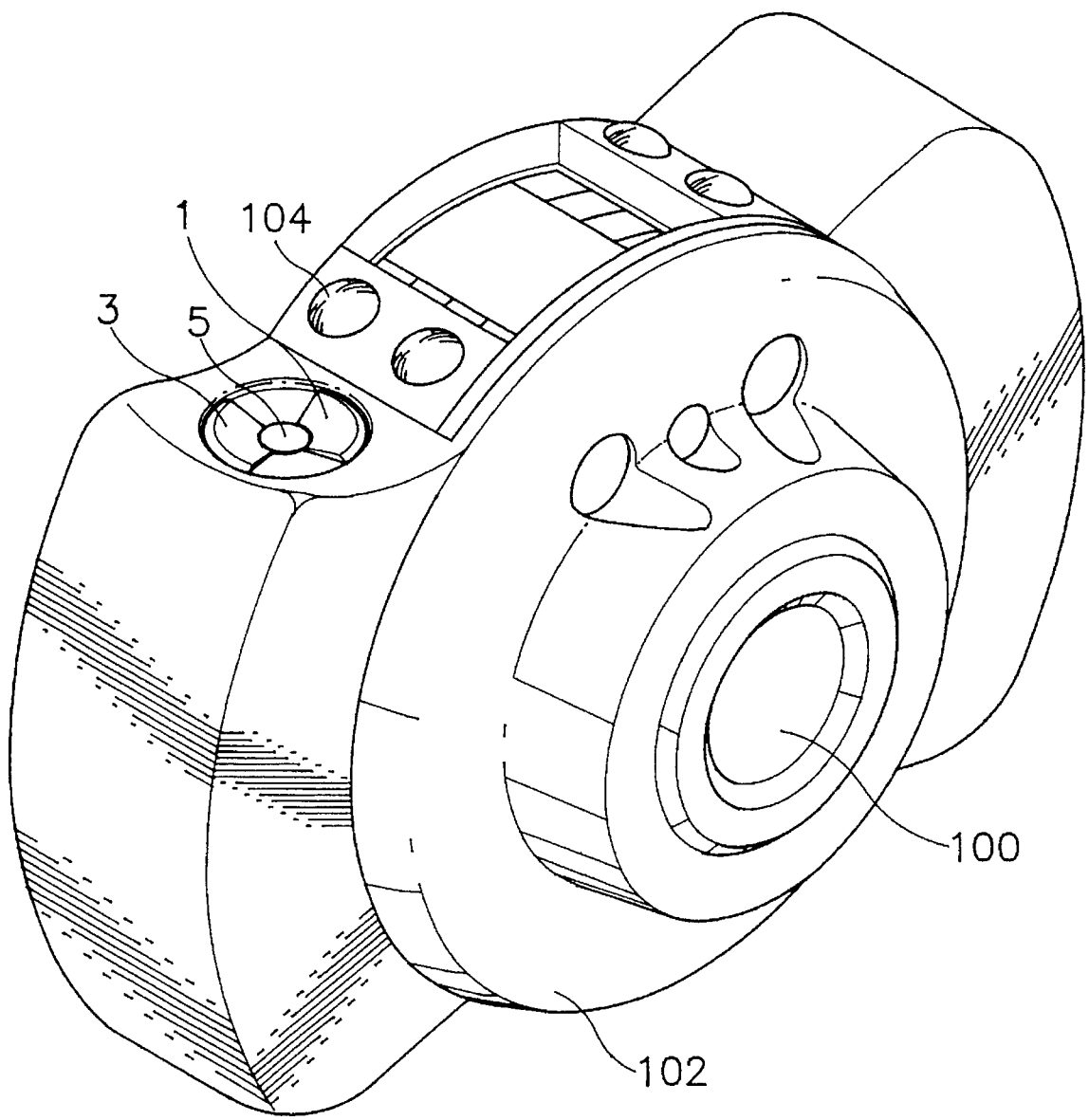
FIG. 1 is a perspective view showing a camera with a motor-driven zoom lens having a switch assembly according to the preferred embodiments of the present invention.

The following is a description of the preferred embodiments of the invention. Corresponding reference numbers will be used throughout the drawing to refer to the same or like parts.

Figure 2:
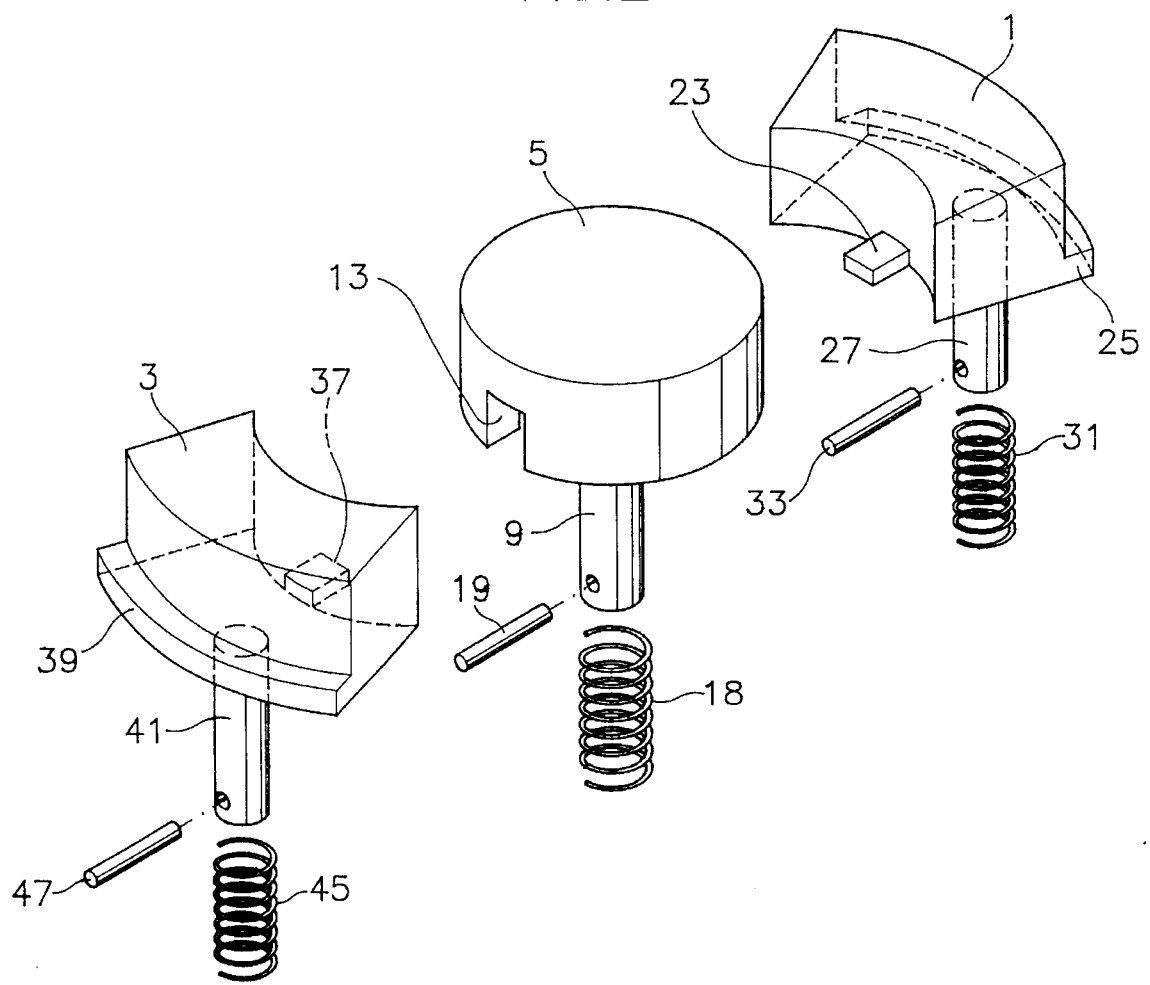
FIG. 2 is an exploded perspective view showing a first preferred switch assembly.
Figure 3:
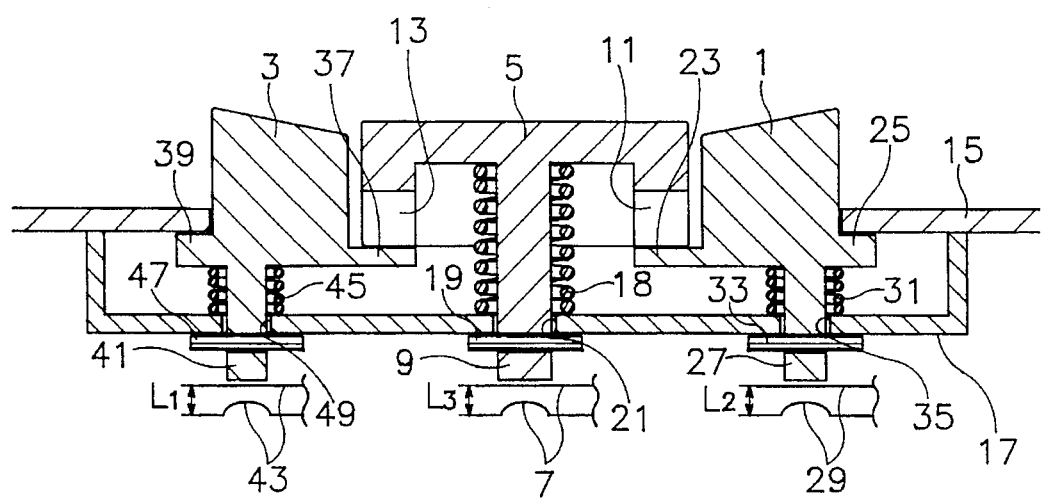
FIG. 3 is a sectional view of the multiple switch shown in FIG. 2.

FIG. 1 shows a preferred camera, including a main body 102, power button 104, a shutter release button 5, a telephoto button 1, and a wide-angle button 3 abutting the shutter release button 5. As shown in FIGS. 2 and 3, the shutter release button 5 is located midway between the telephoto button 1 and the wide-angle button 3. Buttons 5, 1, 3 operate independently of each other.

A rod 9 is fixed to a bottom of the shutter release button 5. The rod 9 extends through an opening on a supporting plate 17 attached to a top cover 15 of the camera. Guide grooves 11 and 13, on lateral portions of the shutter release button 5, provide smooth movements between the shutter release button 5 and the telephoto button 1, and between the shutter release button 5 and the wide-angle button 3.

An elastic member 18 is located between the shutter release button 5 and the supporting plate 17. When a user's finger pushes release button 5, the rod 9 moves downward to act on electrical contacts 7, and when the finger is removed, the rod 9 and release button 5 moves upward to the original position due to the biasing force of the elastic member 18. A stopper 19 attached to the rod 9 at a location below the supporting plate 17 keeps the shutter release button 5 engaged with the support plate 17 by defining an upper extreme of movement of the rod 9.

Rod 27 is fixed to the bottom of the telephoto button 1. Rod 27 extends through an opening defined by the supporting plate 17. Elastic member 31 is located between the telephoto button 1 and the supporting plate 17. When the finger pushes button 1, the rod 27 moves downward to act on electrical contact 29 coupled to a zooming motor (not shown) for driving the zoom lens 100, and when the finger releases, the rod 27 together with the telephoto button 1 moves up to the original position due to the biasing force of the elastic member 31. A stopper 33 attached to the rod 27 at a location below the supporting plate 17 keeps the telephoto button 1 engaged with the support plate 17 by defining an upper extreme of movement of the rod 27.

Rod 41 is fixed to the bottom of wide-angle button 3. Rod 41 extends through an opening defined by the supporting plate 17. Elastic member 45 is located between the wide-angle button 3 and the supporting plate 17. When the finger pushes button 3 the rod 41 moves downward to act on electrical contact 43 coupled to the zooming motor, and when the finger releases, the rod 41 together with the wide-angle button 3 moves up to the original position due to the biasing force of the elastic member 45. A stopper 47 attached to the rod 41 at a location below the supporting plate 17 keeps the wide-angle button 3 engaged with the supporting plate 17 by defining an upper extreme of movement of the rod 41.

In other words, the telephoto button 1 is for moving the zoom lens toward a telephoto position, and the wide-angle button 3 is for moving the zoom lens away from the telephoto position, toward a wide-angle position. As shown in FIG. 3, the telephoto button 1 is located in proximity to shutter release 5, the distance between telephoto 1 button and shutter release button 5 being no more than the width of shutter button release 5. Similarly, the wide-angle button 3 is located in proximity to shutter release button 5, the distance between wide-angle button 3 and shutter release button 5 being no more than the width of shutter release button 5.

The telephoto button 1 has a protrusion 23 on a lateral portion thereof for slidable engagement with the guide groove 11 on the shutter release button 5 and a rim portion 25 abutting on an edge portion of the top cover 15 of the camera when the rod 27 reaches the upper extreme of movement. Similarly, the wide-angle button 3 has a protrusion 37 on a lateral portion thereof for slidable engagement with the guide groove 13 on the shutter release button 5 and rim portion 39 abutting on an edge portion of the top cover 15 of the camera when the rod 41 reaches the upper extreme of movement.

Both the telephoto button 1 and the wide-angle button 3 have maximum heights greater than the maximum height of the shutter release button 5, and top surfaces of the telephoto button 1 and the wide-angle button 3 are inclined toward the shutter release button 5 such that their sides abutting on the shutter release button 5 are lower than their sides farther from the shutter release button 5. As shown in FIG. 3, the shutter release button 5 is higher than lower sides of the telephoto button 1 and the wide-angle button 3, allowing the user to push the shutter release button 5 easily without touching the telephoto button 1 or the wide-angle button 3.

In other words, the shutter release button 5 includes a first portion having a first distance from the main body 102, the first portion being more distant from the main body 102 than any remaining portion of the shutter release button 5, the telephoto button 1 includes a second portion having a second distance from the main body 102, the second portion being more distant from the main body 102 than any remaining portion of the telephoto button 1, and the wide-angle button 3 includes a third portion having a third distance from the main body 102, the third portion being more distant from the main body 102 than any remaining portion of the wide-angle button 3, wherein the first distance from the main body 102 is less than the second distance from the main body 102, and the first distance from the main body 102 is less than the third distance from the main body 102.

With the switch assembly shown in FIGS. 2 and 3, the user may easily move his or her finger from the shutter release button 5 to find the telephoto button 1 and the wide-angle button 3 by feel. Because the top surfaces of the telephoto button 1 and the wide-angle button 3 are inclined, these buttons can be pushed easily by gliding the finger from the shutter release button 5 and by pushing the telephoto button 1 and the wide-angle button 3 slightly.

A stroke of the shutter release switch for a switching operation can be made longer than that of the telephoto switch and the wide-angle switch for switching operations thereof by enlarging the magnitude of the switch gap L3 more than that of the switch gaps L1 and L2 or by enlarging the distance from the lower end of the rod 9 to the electrical contacts 7 more than that from the lower ends of the rods 27 and 41 to the electrical contacts 29 and 43. This gives priorities to the telephoto switch and the wide-angle switch, i.e., if the shutter release button 5 and the telephoto button 1 or the wide-angle button 3 are unintentionally pushed simultaneously, the telephoto switch or the wide-angle switch will be activated prior to the shutter release switch. With an electronic logic circuit, the shutter release may be inhibited when the shutter release switch is activated while either the telephoto or wide-angle switch is activated.

If the user pushes the power bottom 104, the zooming motor is operated to drive the zoom lens 100 into a standby state. At this state, by pushing either the telephoto button 1 or the wide-angle button 3, the zoom lens 100 can be driven toward the telephoto position or the wide-angle position as desired. After the zoom lens 100 is adjusted, the shutter release button 5 is pushed to take a photograph. The movements of the protrusions 23 and 37 on the telephoto button 1 and the wide-angle button 3 are guided by the guide grooves 11 and 13 on the shutter release button 5, and therefore, the relative movements among the telephoto button 1, the shutter release button 5 and the wide-angle button 3 are guided smoothly.

In summary, in the first preferred embodiment, each of the shutter release switch, the telephoto switch and the wide-angle switch includes a button, the button for the shutter release switch being abutted on the buttons for the telephoto switch and the wide-angle switch, a rod fixed to a bottom of the button and extended through an opening on a supporting plate attached to a top cover of the camera, an elastic member located between the button and the supporting plate, and a stopper attached to the rod at a location below the supporting plate, the stopper defining an upper extreme of the upward movement of the rod, and the button together with the rod being moved downward when pushed by a finger and upward by the elastic member when the finger is released to act on electrical contacts.

Figure 4:
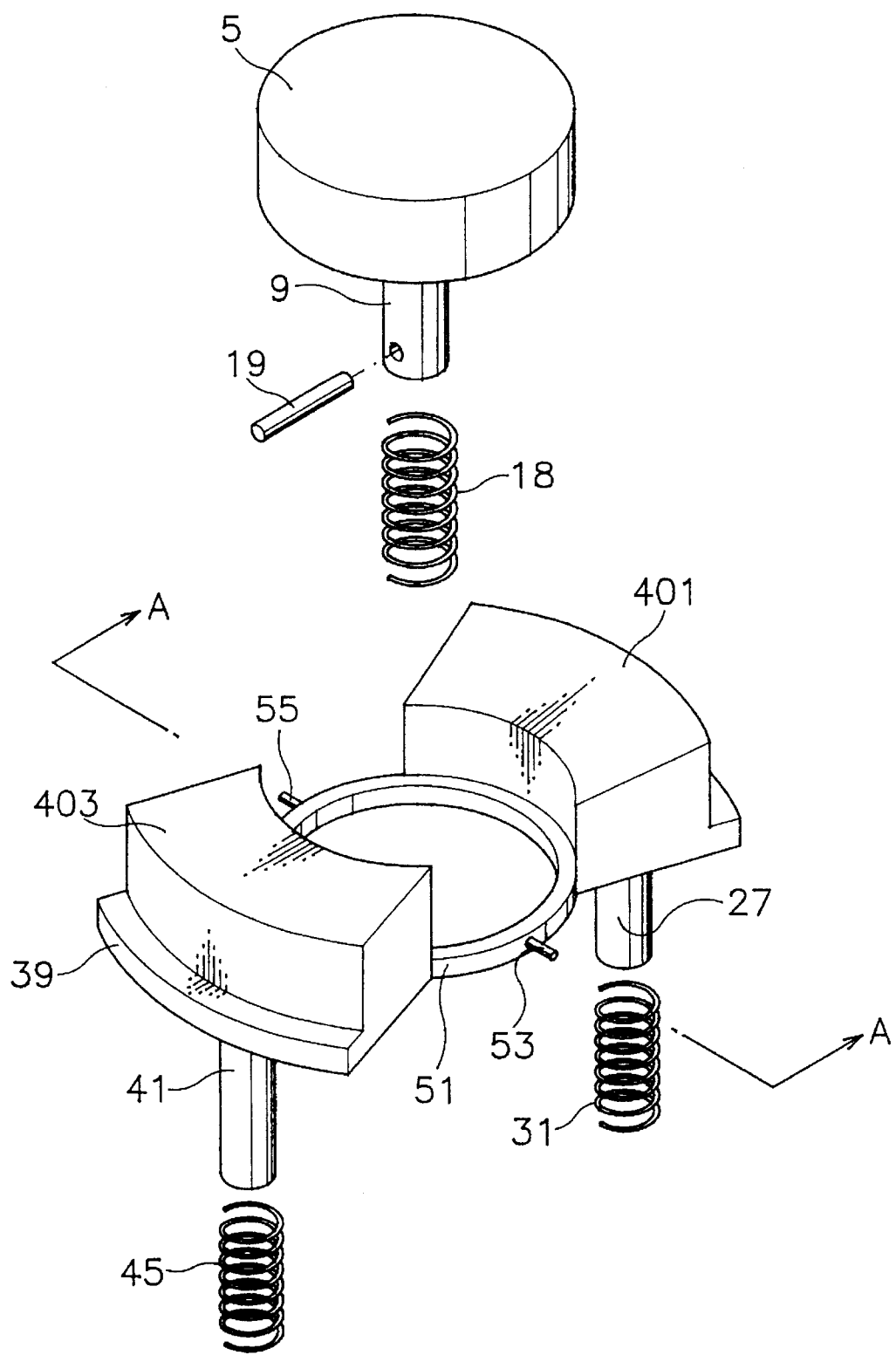
FIG. 4 is an exploded perspective view showing a second preferred switch assembly.
Figure 5:
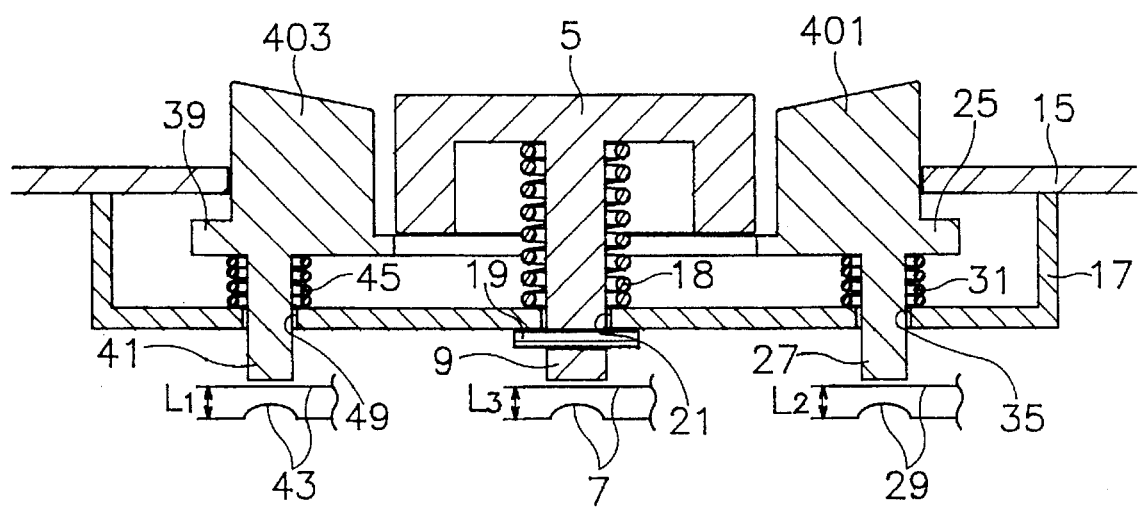
FIG. 5 is a sectional view of the multiple switch shown in FIG. 4.
Figure 6:
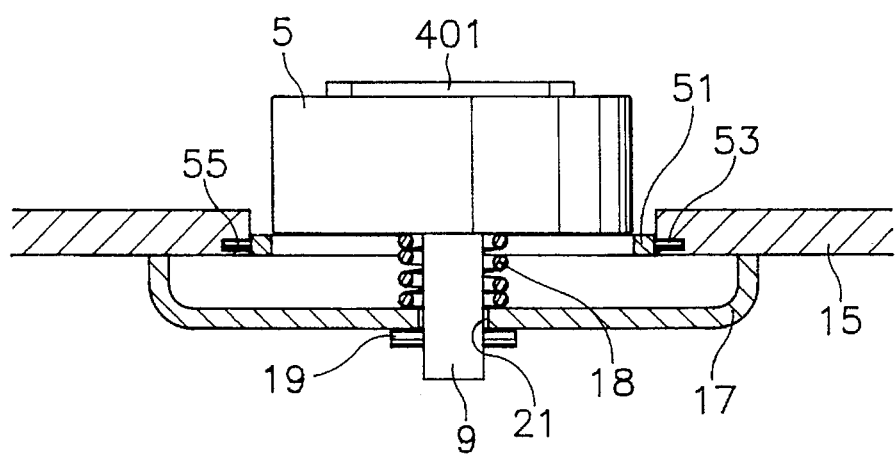
FIG. 6 is a sectional view taken along the axis A—A of FIG. 4.
Figure 7:
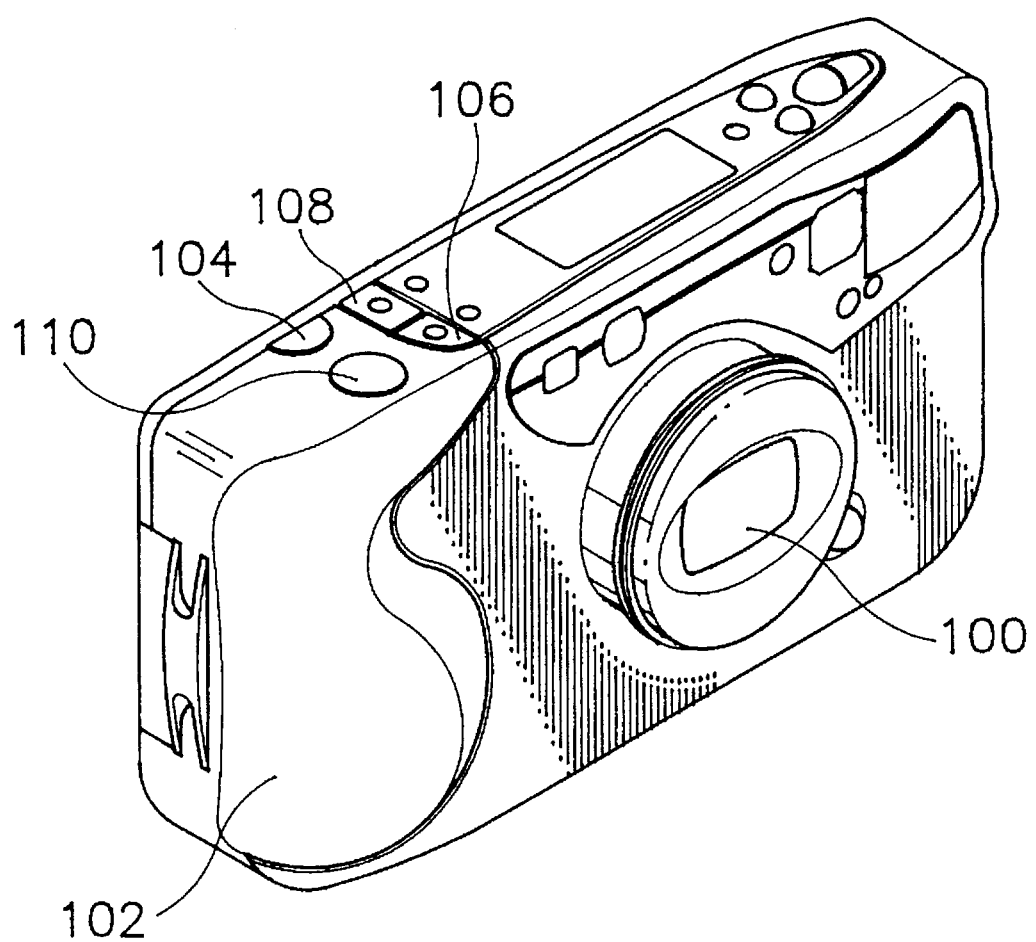
FIG. 7 is a perspective view of a proposed camera with a motor-driven zoom lens.

FIGS. 4 and 5 show a switch assembly of a second preferred embodiment of the present invention. FIG. 6 shows a section taken along the axis A—A in FIG. 4. Telephoto button 401 and the wide-angle button 403 are integrally formed with a ring-shaped connector 51 interconnecting the telephoto button 401 and the wide-angle button 403 and surrounding the shutter release button 5. The connector 51 is rotatably coupled to the top cover 15 of the camera by means of hinge pins 53 and 55, and the telephoto button 401 and the wide-angle button 403 rise or fall with a seesaw movement centered on the geometric line connecting the pins 53 and 55.

The second preferred switch assembly ensures that the telephoto button 401 and wide-angle button 403 are never pushed simultaneously. Under a state where the elastic reaction forces exerted by the elastic member 31 and 45 are balanced, the intervals between the top cover 15 and the rims 25 and 39 of the telephoto button 401 and the wide-angle button 403 are kept equal. Because the hinge pins 53 and 55 are coupled to the top cover 15, the telephoto button 401 and the wide-angle button 403 are kept engaged with the top cover 15 without stoppers.

As illustrated and described above, the switch assembly according to the present invention allows individual switches to be pushed conveniently and promptly without malfunction. Particularly, the user can move between switches by simply rolling a finger without removing the finger from the camera.

It will be evident to those skilled in the art that the invention is not limited to the details of the foregoing illustrative embodiments and that the present invention may be embodied in other specific forms without departing from the spirit or essential attributes thereof. The present embodiments are therefore to be considered as illustrative and not restrictive.

What is claimed is:

1. A switch assembly for a camera with a zoom lens and a top cover comprising:

a shutter release switch for effectuating a photographic operation of the camera;

a telephoto switch for effectuating the movement of the zoom lens to a telephoto position; and a wide-angle switch for effectuating the movement of the zoom lens to a wide-angle position, said telephoto and wide-angle switches adjacent and surrounding the shutter release switch;

wherein the shutter release switch includes:

a release button abutting on a telephoto button associated with the telephoto switch and wide-angle button associated with the wide-angle switch;

a first rod fixedly attached to the shutter release button and extended toward a supporting plate integral in the camera;

an elastic member between the shutter release button and the supporting plate; and a stopper attached to the first rod below the supporting plate to define an upper limit for the upward movement of the first rod away from the supporting plate; and wherein each of the telephoto switch and the wide-angle switch includes:

a second and third rod fixedly attached to each of the telephoto and wide-angle buttons and extended toward the supporting plate;

an elastic member between each of the telephoto and wide-angle buttons and the supporting plate; and a stopper attached to each of the second and third rods below the supporting plate to define an upper limit for the upward movement of the second and third rods away from the supporting plate; and wherein each of the telephoto and wide-angle buttons has a protrusion integral thereon for slidable engagement with a guide groove on the shutter release button; and a rim portion abutting on an edge portion of the top cover of the camera when the rods reach said upper limit for the upward movement of the rods.

2. A camera comprising:

a shutter;

a lens;

a first button having a first width for releasing the shutter;

a second button for moving the lens toward a position, the second button spaced a first distance from the first button, the first distance being less than the first width; and a third button for moving the lens away from said position, the third button spaced a second distance from the first button, the second distance being less than the first width, the first button between the second button and the third button, wherein the first button includes a first guide groove opposite the second button and a second guide groove opposite the third button, wherein the second button includes a protrusion for slidable engagement with the first guide groove, and the third button includes a protrusion for slidable engagement with the second guide groove.

* * * * *